L. E. BAKER.
INDICATOR FOR DISPENSING APPARATUS.
APPLICATION FILED DEC. 22, 1916.

1,270,098.

Patented June 18, 1918.
3 SHEETS—SHEET 1.

WITNESSES:

INVENTOR.
Linnaeus E. Baker
BY
ATTORNEY.

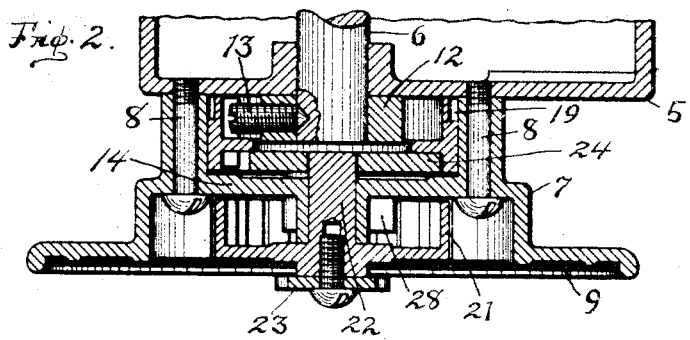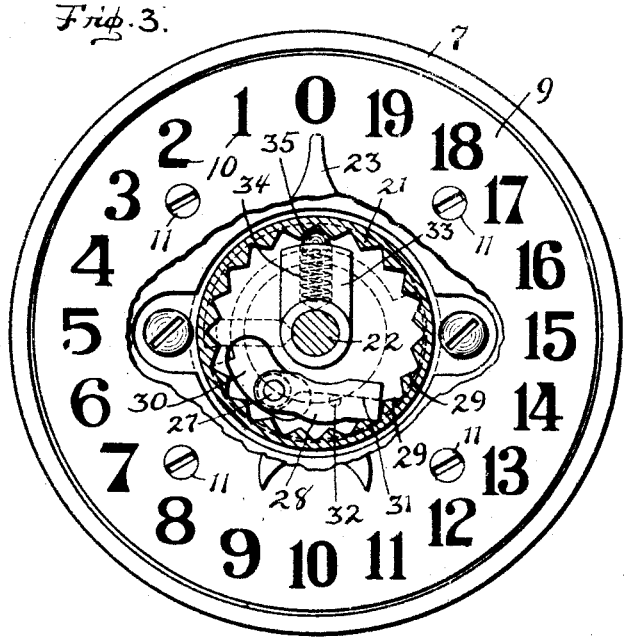

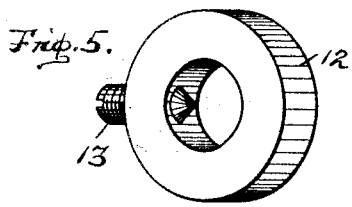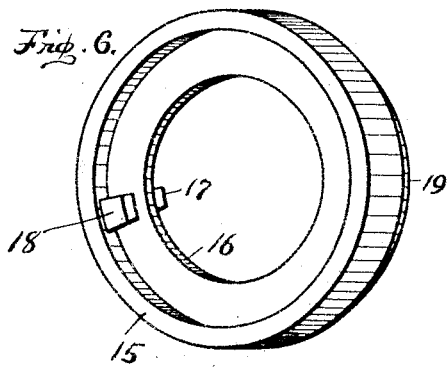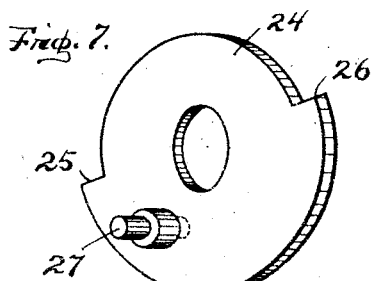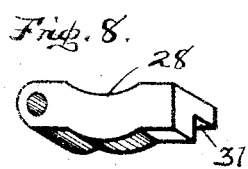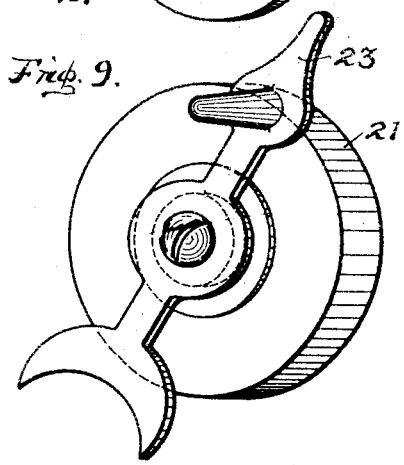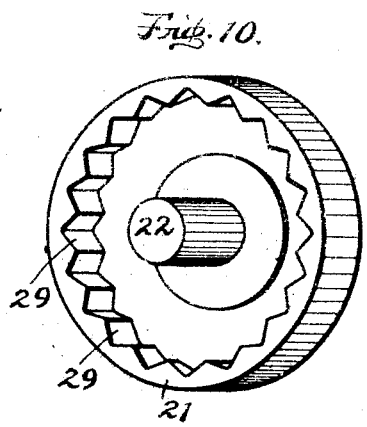

UNITED STATES PATENT OFFICE.

LINNAEUS E. BAKER, OF FORT WAYNE, INDIANA, ASSIGNOR TO WAYNE OIL TANK AND PUMP COMPANY, A CORPORATION OF INDIANA.

INDICATOR FOR DISPENSING APPARATUS.

1,270,098.  Specification of Letters Patent.  Patented June 18, 1918.

Application filed December 22, 1916. Serial No. 138,299.

*To all whom it may concern:*

Be it known that I, LINNAEUS E. BAKER, a citizen of the United States of America, and resident of Fort Wayne, in the county of Allen and State of Indiana, have invented certain new and useful Improvements in Indicators for Dispensing Apparatus, of which the following is a specification.

This invention relates to improvements in indicators for dispensing apparatus and the object thereof is to provide a device that will designate the amount of the liquid discharged by the apparatus as it passes through its cycles of operation. Also the invention is calculated to designate accumulatively in units of measurement the quantity of liquid discharged by the pump during its operation. The intention is to provide means of displaying to patrons of the dispensing apparatus a dependable, and easily understood indication of the amount of liquid expelled by the apparatus when operated upon each transaction. And, a further object it to provide mechanism that will indicate the quantity of fluid discharged by it at the completion of each cycle of action, and accumulatively show the amount of fluid expelled upon each transaction.

The objects of the invention are accomplished by the construction illustrated in the accompanying drawings in which:

Fig. 2 is a horizontal central section through the counter mechanism.

Fig. 3 is a front view of the dial, which is partly cut away to disclose parts of the mechanism in the rear thereof;

Fig. 4 is a vertical central section of Fig. 3;

Fig. 5 is a detail view in perspective showing a collar with a projecting set-screw that is fixed upon the actuating shaft of the pumping mechanism.

Fig. 6 is a detail in perspective showing a drag-ring that is used in the transmission of movement in the device.

Fig. 7 is a detail view in perspective showing a drag-plate that is actuated by the ring previously mentioned;

Fig. 8 is a detail in perspective of a pawl that is carried by the drag-plate;

Fig. 9 is a detail view in perspective of the index and internally notched member associated therewith; and Fig. 10 is a detail view in perspective of the internally notched member.

Similar characters of reference indicate corresponding parts throughout the several views and referring now to the same;

Figure 1:
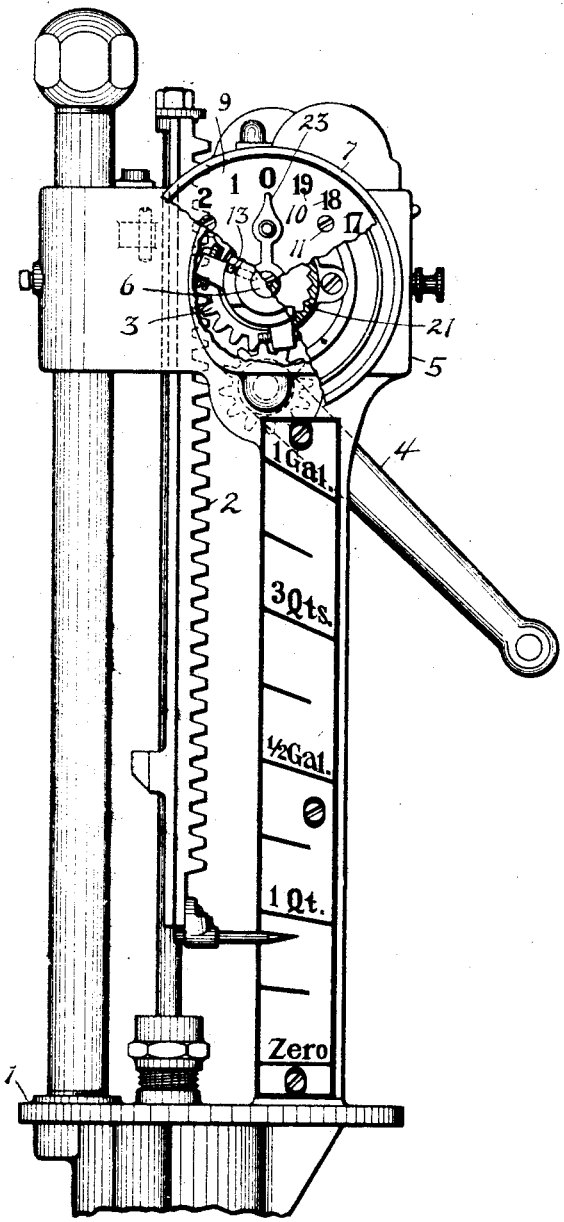
Figure 1 is an elevation of the front of the apparatus, showing the pumping mechanism with the invention applied thereto, parts thereof being cut away.

The present invention is designed for use in conjunction with a reciprocating dispensing pump (1) which is generally provided with a rack (2) and gear mechanism (3) that is actuated by means of a crank (4), the gear mechanism being mounted in a standard (5) and provided with a shaft (6) that oscillates to and fro accordingly as the pump is actuated. The present apparatus derives its action primarily from the movement of the shaft (6) that actuates the pump proper and may be applied to dispensing pumps of that class in which an oscillating driving or transmission shaft is employed. The pumping mechanism illustrated herein is given as an example in the class of apparatus to which the present invention is applicable and is of a well known construction of dispensing pump and is fully set forth in Letters Patent of the United States 1,188,030 issued June 20, 1916, to Reuben E. Bechtold. However, the invention may be successfully applied to many other dispensing pumps and apparatus in which an oscillating drive-shaft or transmission shaft is employed from which suitable motion may be derived for actuating the mechanism.

The present invention includes a housing (7) that is secured by means of screws (8) to the front of the standard (5) of the pump, the housing being cylindrical in form and arranged in axial alinement with the pump-shaft (6). Upon the front of the housing is secured a dial (9) bearing an annular series of indicating characters (10) which are intended to denote the quantity in units of measurement of liquid dispensed by the pump mechansim. The dial is held in place upon the housing by means of screws (11).

For convenience in applying the invention to the pump, the pump-shaft (6) is made to project through the front of the housing (5) and a collar (15) is secured thereupon by means of a set-screw (12) that projects radially beyond the outer perimeter of the collar. The housing (7) has a partition (14) therein, and within the housing, between the partition and the adjacent face of the standard (5), is loosely arranged a drag-ring (15). Within the ring is a flange (16) and upon each side of the flange are arranged lugs (17) and (18) respectively. Also, the ring (15) has an external annular chamfer (19) adapted to receive a screw (20), the latter being for the purpose of holding the ring within the housing while admitting of the rotation of the former. The movement of the ring is effected by the turning movement of the pump-shaft (6) through the medium of the projecting end of the set-screw (13) which is adapted to engage the lug (17) that extends into the path of the set-screw. As the pump-shaft turns in one direction the set-screw engages the lug (17) and as the pump-shaft continues its movement in the same direction the ring is progressed. When the direction of rotation of the pump-shaft is reversed the set-screw on the collar is moved from the lug (17), leaving the ring stationary until the set-screw reaches the opposite side of the lug (17) whereupon movement of the ring occurs correspondingly in the opposite direction to its previous movement. The intention is that the ring shall have oscillating movement to an extent substantially less than that of the pump-shaft. This is effected because of the play afforded the set-screw in moving from one side of the lug (17), when the pump-shaft is driven in one direction, to the opposite side of the lug when driven in the opposite direction.

In the front portion of the housing (7) is rotatably mounted an internally notched member (21) having a stem (22) that extends through the partition (14) and has bearing therein and is arranged in alinement with the pump-shaft (6). The stem also extends loosely through the dial (9) at the center thereof and has fixed thereon an index (23) adapted to rotate therewith. The notched-member is retained in position within the housing by the dial upon one side and the partition upon the other.

Upon the inner end of the stem (22) is loosely mounted a drag-plate (24) having diametrically opposite shoulders (25) and (26) respectively. The drag-plate lies within the outer portion of the ring (15) and its shoulders are adapted to become engaged by the lug (18) of the ring alternately as the latter is oscillated. A stud (27) extends forwardly from the drag-plate and has loosely mounted thereon a pawl (28) adapted to engage in the notches (29) of the member (21). The stud on the drag-plate extends through a slot (30) made in the partition (14) to admit of its movement. The pawl (28) has a ledge (31) on its rear side that rests normally upon a pin (32) that projects from the partition (14), the purpose of which is to prevent the pawl from premature engagement with the notches of the notched member in the event the movement of the drag-plate is greater than is necessary to move the pawl beyond the successive notch.

Upon the front of the partition (14) is a chambered boss (33) having a spring (34) therein and also a ball (35) that is compressed by the spring against the notched surface of the member (21), the purpose thereof being to detain the notched member frictionally as it is progressed from stage to stage by engagement in the notches thereof successively.

It is the intention that the device shall be so proportioned in its working parts that the movement of the pump-shaft (6), upon each complete cycle of the pump mechanism, will effect the progression of the notched-member, having the index fixed thereon, to an extent equal to the space of one of its notches, so that as the notched member is advanced from notch to notch, the index will become likewise progressed through corresponding stages and point accordingly to the indicating characters (10) that appear upon the dial, which numerically are precisely the same as the notches in the notched member. In order that the performance of the index shall correspond accurately with the complete cycles of the pumping mechanism, it is essential that the notched member shall be advanced but a single notch upon each cycle of the pump. It is therefore essential that the shoulders (25) and (26) on the drag-plate (24) shall be so spaced apart that contact with the lug (18) on the ring, as the latter is oscillated, will result in a proper degree of movement imparted to the drag-plate that will effect a sufficient movement of the pawl (28), attached thereto, to insure the progression of the notched member to the extent of one notch and not more.

In the operation of this invention, when applied to a pumping mechanism of the character herein disclosed, the pump-shaft (6) revolves as the rack is reciprocated by the gear mechanism, the pump-shaft being rotated first in one direction and then oppositely in order to effect reciprocal movement of the rack. The set-screw on the collar which is attached to the pump-shaft, during the movement of the latter, comes into contact with the lug (17) on the ring and effects movement thereof in the same direction. The lug (18) on the ring, during the progression of the latter, comes into contact with the shoulder (26) on the drag-plate with the result that the drag-plate is progressed and the pawl (28) pivoted upon the stud (27) is moved from one notch in the notched member to the succeeding notch into which it gravitates. Should the movement of the drag-plate be so extensive as to carry the pawl beyond the intended notch, the pin (32) which extends beneath the ledge (31) on the pawl, detains the pawl from engagement with the second succeeding notch. When the pump-shaft is reversed, as in effecting the return stroke of the rack, the set-screw on the collar is progressed to contact with the opposite side of the lug (17) and the ring becomes progressed in a direction opposite to its former movement, and the lug (18) on the ring, during the progression of the latter, comes into contact with the shoulder (25) on the drag-plate with the result that the latter is moved to its former position. The notched member therefore becomes progressed through the medium of the pawl as the drag-plate is returned, and the index is accordingly advanced from one indicating character to the next one succeeding. The detention ball (35) frictionally detains the notched member in each position as it is advanced. The index may be placed initially to point to any of the indicating characters by manually turning it in the same direction in which it is actuated by the pawl.

By this construction, owing to the play of the set-screw on the collar, before contacting with the lug (17), and owing also to the play of the lug (18), before contacting with the shoulder (26) of the drag-plate, the pawl is not moved into the next succeeding notch approximately until one end of the stroke of the pump has been reached. Also, when the movement of the pump-shaft is reversed, owing to the play of the set-screw in reaching the opposite side of the lug (17) and the play of the lug (18) in reaching the shoulder (25) of the drag-plate, the progression of the notched member by the movement of the pawl occurs approximately at the completion of the return stroke of the pump. Thus the index becomes progressed from one stage to another only upon complete reciprocation of the pump. In effect, the pawl becomes moved into engagement with the next succeeding notch in the notched member at the completion of the upward stroke of the pump, and the notched member becomes progressed to the extent of the space of one of its notches at the completion of the downward stroke of the pump, and the index therefore becomes progressed from one indicating character to the next succeeding character at the end of the complete cycle of the pump which includes both the upward and downward strokes thereof.

What I claim is:—

1. In apparatus of the class described, in combination with a mechanism having an oscillating shaft; a collar fixed on the end of the shaft having a projection; a housing supported in axial alinement with the pump-shaft; a drag-ring having two lugs one of which is adapted to be engaged upon its opposite sides by the projection on the collar as the latter is oscillated; an internally notched member arranged in axial alinement with the pump-shaft; a drag-plate having shoulders thereon spaced apart adapted to be engaged alternately by the other of said lugs on the ring; a pawl in pivotal connection with the drag-plate and engaging the notched member; a detent device engaging the notched member; a dial on the front of the housing having an annular series of indicating characters thereon; and an index in fixed relation with the notched member and adapted to register with said characters successively accordingly as the notched member is progressed.

2. In apparatus of the class described, a housing; a drag-ring mounted therein; a driving member adapted to oscillate the ring; a drag-plate having two shoulders spaced apart and being adapted to be oscillated by said ring, the latter having means in connection therewith for alternately engaging said shoulders as it is oscillated; a notched member; a pawl mounted in connection with the drag-plate and having actuating relation with the notched member; a dial on the front of the housing; and an index in fixed relation with the notched member and adapted to traverse the dial.

3. In apparatus of the class described, a housing having a dial thereon; a notched member having an index thereon adapted to traverse the dial; a drag-plate having a pawl in connection therewith that engages the notched member and drives the same in one direction as the drag-plate is oscillated; an oscillating driving member; and a drag-ring adapted to be engaged by the driving member and moved thereby during a portion only of each movement thereof, and having also engaging relation with the drag-plate, the latter being adapted to be moved thereby during a portion only of each movement of the ring.

4. In apparatus of the class described, a housing, an oscillating drag-ring therein; an oscillating drive-member adapted to move the ring in opposite directions at the ends of its movements respectively; a drag-plate adapted to be moved in opposite directions by the ring at the ends of the corresponding movements thereof; a notched member having an index fixed thereon; means in connection with the drag-plate for actuating the notched member at the conclusion of one of its movements; and a dial adapted to be traversed by the index.

5. In apparatus of the class described, an indicating device including a dial, index and notched member for progressing the latter; an oscillating drag-plate; a pawl pivoted on the latter and engaging the notched member; an oscillating drive-member; and an oscillating drag-ring having driven relation with the drive-member and driving relation with drag-plate, there being play between the ring in its engagements with both the drive-member and drag-plate.

In testimony whereof I affix my signature, in presence of two witnesses.

LINNAEUS E. BAKER.

Witnesses:
 ALMON D. HEATH,
 RUTH W. SHINABERY.